United States Patent [19]

Turner

[11] Patent Number: 5,326,054
[45] Date of Patent: Jul. 5, 1994

[54] APOGEE AT CONSTANT TIME-OF-DAY EQUATORIAL (ACE) ORBIT

[75] Inventor: Andrew E. Turner, Palo Alto, Calif.

[73] Assignee: Space Systems/Loral, Inc., Palo Alto, Calif.

[21] Appl. No.: 146,651

[22] Filed: Jan. 21, 1988

Related U.S. Application Data

[63] Continuation-in-part of Ser. No. 915,825, Oct. 6, 1986, abandoned.

[51] Int. Cl.$^5$ .............................................. B64G 1/10
[52] U.S. Cl. .................................... 244/158 R; 342/352
[58] Field of Search .................... 342/356, 352–355, 342/357–358; 244/158 R, 164; 455/13; 364/459

[56] References Cited

U.S. PATENT DOCUMENTS

| | | | |
|---|---|---|---|
| 3,163,820 | 12/1964 | Hight | 455/12 |
| 3,224,000 | 12/1965 | Bloetscher et al. | 244/158 R |
| 3,243,706 | 3/1966 | Grisham | 244/158 R |
| 3,349,398 | 10/1967 | Werth | 342/353 |
| 3,706,037 | 12/1972 | Lundgren, Jr. | 455/13 |
| 3,836,969 | 9/1974 | Bond et al. | 342/356 |
| 3,852,750 | 12/1974 | Klein | 342/396 |
| 3,995,801 | 12/1976 | Bond | 244/158 R |
| 4,004,098 | 1/1977 | Shimasaki | 370/104 |
| 4,375,697 | 3/1983 | Visher | 455/13 |
| 4,502,051 | 2/1985 | Dondl | 342/356 |
| 4,630,058 | 12/1986 | Brown | 342/352 X |
| 4,763,129 | 8/1988 | Perrotta | 342/356 |

OTHER PUBLICATIONS

K. M. Price et al., "The Use of Satellites in Non-Geostationary Orbits for Unloading Geostationary Communications Traffic Peaks", final report for NASA Contract NAS3-24891, May 1987.

A. E. Turner, "New Non-Geosynchronous Orbits for Communications Satellites to Off-Load Daily Peaks in Geostationary Traffic", handout accompanying oral presentation given at meeting of American Institute of Aeronautics and Astronautics and American Astronautical Society in Kalispell, Montana, Aug. 10, 1987.

G. H. Stevens et al., "Complementary Satellite Sound Broadcasting Systems", a NASA assessment for the Voice of America presented in Washington, D.C., Apr. 1987.

"Final Report, Voice Broadcast Mission Study, vol. II—Study Report" for NASA Contract No. NASw-1475, Jul. 14, 1967, pp. 2–8 and 2–9.

K. M. Price, Monthly Technical Progress Narrative Report No. 1 for NASA Contract No. NAS3-24891, "The Use of Satellites in Non-Geostationary Orbits for Unloading Geostationary Communications Satellite Traffic Peaks", May 13, 1986.

*Primary Examiner*—Bernarr E. Gregory
*Attorney, Agent, or Firm*—Edward J. Radlo

[57] ABSTRACT

A man-made satellite (1) traveling in an elliptical orbit. The orbit has five or six daily apogees, which are positioned above the same longitudes of the earth at substantially the same local time-of-day for each day of the year. The longitudes and times-of-day can be preselected subject only to the proviso that they be equispaced. The apsidal rotation rate in inertial space (ARRIS) of the orbit is substantially equal to the mean rate at which the earth revolves about the sun. The orbit is preferably equatorial, in order to simplify ground tracking and to maximize the impact of the apsidal rotation.

16 Claims, 12 Drawing Sheets

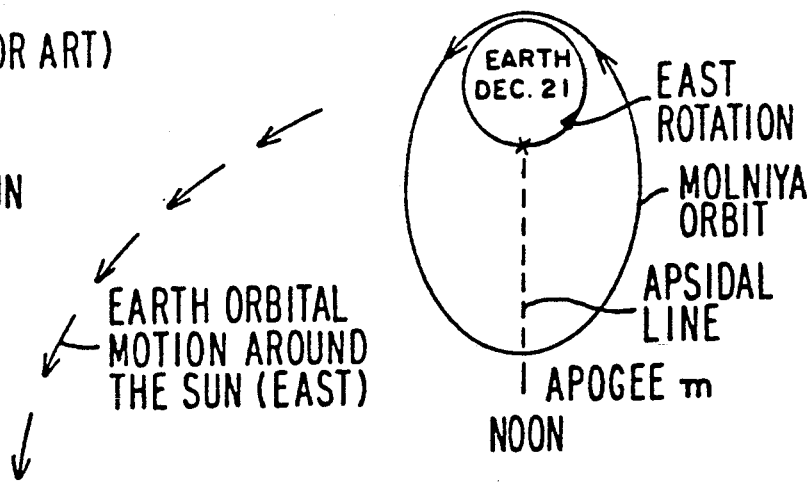
FIG. 1 (PRIOR ART)
MOLNIYA ORBIT ORIENTATION RELATIVE TO SUN
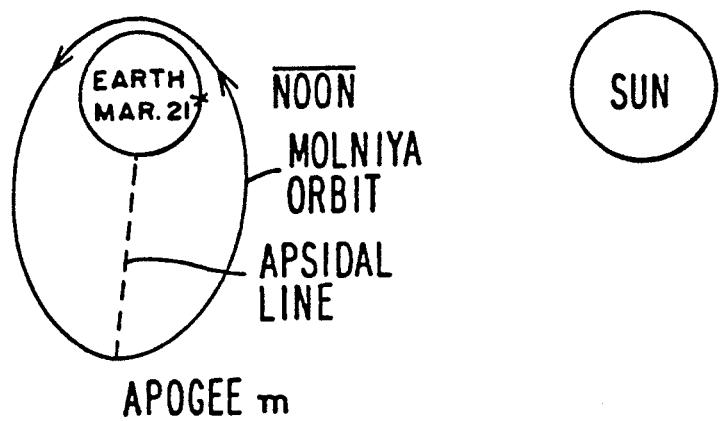
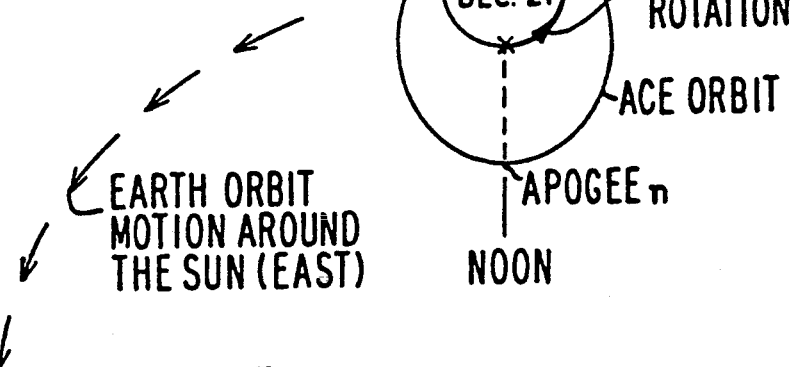
FIG. 2
ACE ORBIT ORIENTATION RELATIVE TO SUN
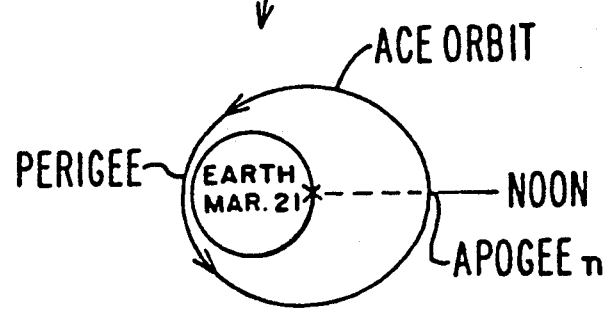

ALTERNATE ACE ORBIT ORIENTATION RELATIVE TO SUN

DIRECTION OF EARTH ROTATION AND SATELLITE ORBITAL MOTION (POSIGRADE)

NODAL REGRESSION

NODAL REGRESSION

APSIDAL ROTATION

ANGULAR SEPARATION OF SATELLITES IN EQUATORIAL ORBITS WITH DIFFERENT ALTITUDES FROM CONUS

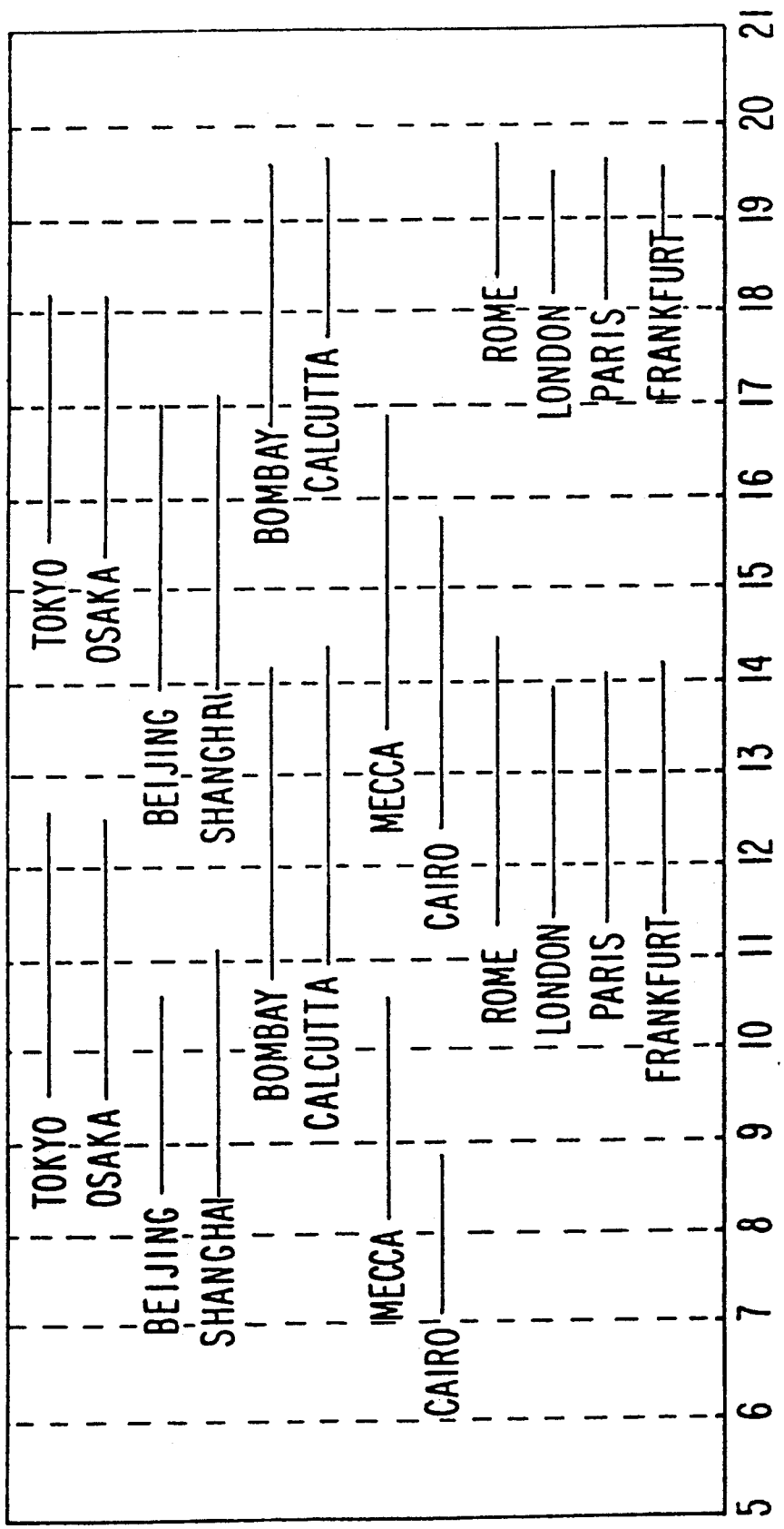

APOGEE AT CONSTANT TIME-OF-DAY EQUATORIAL (ACE) ORBIT

DESCRIPTION

This application is a continuation-in-part of application Ser. No. 915,825 filed Oct. 6, 1986, now abandoned.

TECHNICAL FIELD

This invention pertains to the field of causing man-made satellites to travel in orbits that are useful for communications and other purposes.

BACKGROUND ART

Since 1965, the Soviet Union has used Molniya orbits for over eighty of her communications satellites. These orbits are inclined to the earth's equator by 63.4° and are highly eccentric ellipses. They have zero apsidal rotation and very slow nodal regression, so that the apogee of the orbit can be maintained at 63.4° North latitude.

In such an orbit, a satellite loiters in the apogee region at high northerly latitudes. However, as shown in FIG. 1, the satellite does not reach apogee at the same time-of-day every day of the year. Rather, the Molniya orbit's apsidal line remains oriented in approximately the same direction in inertial space, rotating westward only very slowly. Therefore, the satellite reaches apogee over the same longitude X each day, but approximately four minutes earlier each day (six hours earlier every three months). The Soviet Union overcomes this handicap by placing a constellation of sixteen Molniya satellites in orbit simultaneously, the satellites reaching the loiter zone seriatim. With the present invention, a single satellite 1 can be used to communicate with five or six preselected regions of the earth at the same fixed times each day of the year, which times may advantageously correspond to times of peak demand for satellite communications services. In the present invention, apsidal rotation is intentionally used to keep the satellite 1 over the same longitude on earth at the same time each day.

Molniya satellites usually operate in orbits with eccentricities of approximately 0.7 and periods of just under twelve hours. The instant ACE orbit has an eccentricity of 0.49 and a sidereal period of 4.79 hours, or an eccentricity of 0.23 and a sidereal period of 4 hours.

"Final Report, Voice Broadcast Mission Study, Volume II—Study Report" for NASA Contract No. NASw-1475, Jul. 14, 1967, pages 2-8 and 2-9, teaches away from the instant orbit in its rejection of elliptical orbits for communications purposes. This reference considers apsidal rotation to be a "problem".

K. M. Price, Monthly Technical Progress Narrative Report No. 1 for NASA Contract No. NAS3-24891, "The Use of Satellites in Non-Geostationary Orbits for Unloading Geostationary Communications Satellite Traffic Peaks", May 13, 1986, discloses some of the parameters of the instant ACE orbit.

U.S. Pat. No. 3,163,820 discloses orbits which satisfy one of the two following criteria: 1) the orbit has a greater radius and a longer period than for a geosynchronous orbit; and 2) the satellite has a lower angular speed in the eastward direction than that of the rotating earth. A satellite 1 in the instant ACE orbit, on the other hand, always has a higher angular speed in the eastward direction than the rotating earth. The present invention offers the following advantages over the reference's orbits: 1) a single satellite 1 in an ACE orbit can provide communications coverage for five or six preselected geographical areas of the earth for a certain duration at the same times-of-day every day of the year; and 2) an ACE orbit requires less propellant to achieve for a satellite 1 of fixed size.

U.S. Pat. No. 3,243,706 discloses a system of twelve satellites in circular orbit, as opposed to a single satellite 1 in elliptical orbit of the present invention. The present invention offers the following advantages: 1) a single satellite 1 can provide communications coverage for five or six preselected geographical areas for a certain duration at the same times-of-day every day of the year; and 2) the satellite 1 remains in view of ground terminals 2 longer, and therefore can be tracked at lower slew rates.

U.S. Pat. No. 3,349,398 discloses means for maintaining communications between a satellite and a ground terminal. Such a system could be used in conjunction with the present invention.

U.S. Pat. No. 3,706,037 discloses a system involving two satellites in near-geosynchronous orbits positioned to avoid solar outages resulting from RF interference from the sun. A ground terminal 2 tracking a satellite 1 in the instant ACE orbit slews its antenna in the same pattern each day, while there must be a day-to-day variation in the slew motion necessary to follow a satellite using the orbit described in the reference.

U.S. Pat. No. 3,836,969 discloses a means for reducing stationkeeping propellant consumption by choosing a low inclination, rather than a zero inclination, geosynchronous orbit. The present invention inherently saves propellant because less propellant is required to achieve the instant ACE orbit than a geosynchronous orbit for a fixed spacecraft 1 mass.

U.S. Pat. No. 3,852,750 shows the use of three or more satellites in geosynchronous orbit for navigational, rather than communications, purposes. The instant invention, on the other hand, is more suited for communications than navigation. Navigation requires continuous satellite coverage, which the ACE orbit does not provide unless several satellites 1 are placed in ACE orbits. Rather, the major advantage of placing a satellite 1 into an ACE orbit is to off-load daily peaks in the geostationary satellite communications traffic, peaks which tend to occur at the same time-of-day throughout the year.

U.S. Pat. No. 3,995,801 discloses the use of circular orbits at geosynchronous altitude. The present invention, on the other hand, is an elliptical equatorial orbit having a lower radius than those disclosed in the patent. By avoiding the crowded geostationary arc, antennas of satellites 1 in ACE orbits can be built smaller for the same link budget for certain telecommunications applications.

U.S. Pat. No. 4,004,098 describes a system by which two satellites can communicate between themselves. The present invention, on the other hand, is an orbit in which a single satellite 1 can provide effective communications.

U.S. Pat. No. 4,375,697 discloses multiple satellites traveling in clusters in a geostationary orbit. On the other hand, the present invention is a non-geostationary orbit in which a single satellite 1 can provide useful communications coverage.

U.S. Pat. No. 4,502,051 also discloses a satellite system having many satellites. Multiple backup satellites are required to handle on-orbit failures. This is because the satellites in the system are not in the same orbit. In the present invention, on the other hand, the communications system functions with a single satellite 1. A backup satellite 1 in the same orbit can replace it.

In the reference patent, satellites appear to cross the geostationary arc from the perspective of a ground terminal in the United States and other non-equatorial countries. A ground control station deactivates satellites at these times, to prevent interference with geostationary satellite communications. In the present invention, on the other hand, satellites 1 never appear to cross the geostationary arc from the perspective of a ground terminal 2 in the United States or other non-equatorial country. Interference with geostationary satellite communications is thus advantageously avoided.

The following three papers were published between the filing date of the parent application and that of the instant application:

K. M. Price et al., "The Use of Satellites in Non-Geostationary Orbits for Unloading Geostationary Comunications Satellite Traffic Peaks", final report for NASA Contract NAS3-24891.

A. E. Turner, "New Non-Geosynchronous Orbits for Communications Satellites to Off-Load Daily Peaks in Geostationary Traffic", handout accompanying oral presentation given at meeting of American Institute of Aeronautics and Astronautics and American Astronautical Society in Kalispell, Montana, Aug. 10, 1987.

G. H. Stevens et al., "Complementary Satellite Sound Broadcasting Systems", a NASA assessment for the Voice of America presented in Washington, D.C., April, 1987.

DISCLOSURE OF INVENTION

The present invention is any manmade satellite (1) that travels in a certain elliptical orbit. The satellite (1) revolves about the earth five or six times per day. Each of the five or six apogees corresponding to the five or six daily revolutions is positioned above the same longitude of the earth at substantially the same local time-of-day for each day of the year. The apsidal rotation rate in inertial space (ARRIS) of the orbit is substantially equal to the mean rate at which the earth revolves about the sun.

BRIEF DESCRIPTION OF THE DRAWINGS

These and other more detailed and specific objects and features of the present invention are more fully disclosed in the following specification, reference being had to the accompanying drawings, in which:

FIG. 1 is a sketch showing the prior art Molniya orbit popularized by the Soviet Union;

FIG. 2 is a sketch illustrating a first embodiment of the instant ACE orbit;

FIG. 14 is a chart showing ACE orbit coverage of selected non-United States cities.

BEST MODE FOR CARRYING OUT THE INVENTION

Figure 3:
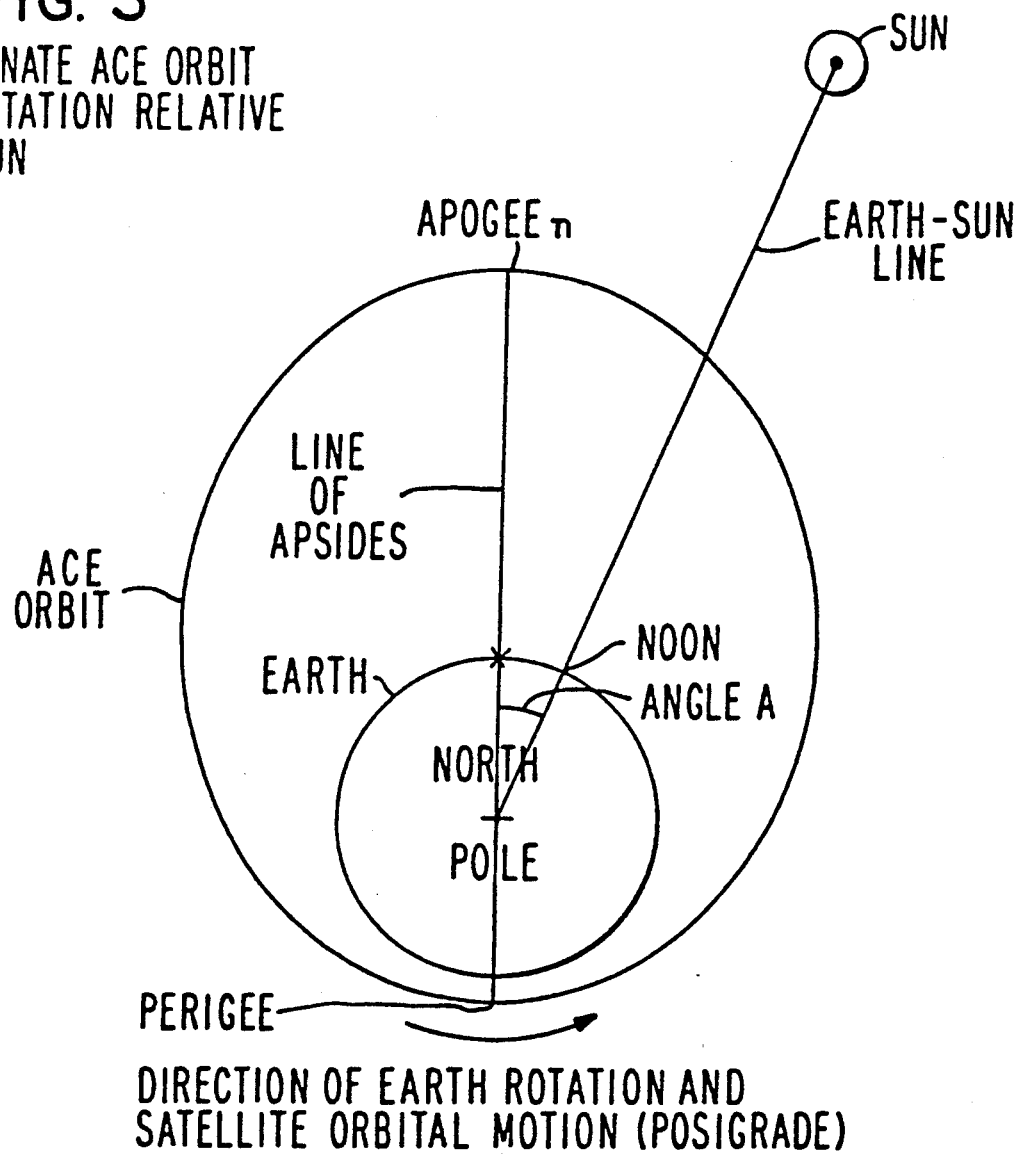
FIG. 3 is a sketch illustrating a second embodiment of the instant ACE orbit.

"ACE orbit" is the abbreviation used herein for the instant Apogee at Constant time-of-day Equatorial orbit. The ACE orbit is sun-synchronous and moderately eccentric, with the satellite 1 completing five or six revolutions per day. The satellite 1 depends upon a continuing perturbation of its orbit to overfly the same areas of the earth at substantially the same local time-of-day each day of the year.

The 4.79 hour orbital sidereal period enables a single satellite 1 in ACE orbit to be used for both the morning traffic peak and, on its next apogee, the afternoon traffic peak for significant populous geographical regions on the earth, including the continental United States (CONUS). Due to the moderately high eccentricity (0.49) of the orbit, the satellite 1, during apogee portions of the orbit, remains "in view" of a given CONUS location for typically over two hours, where "in view" is defined to mean the elevation look angle from the earth location is greater than 10°. The satellite 1 moves rapidly through perigee portions of the ACE orbit, since the velocity of a satellite 1 in elliptical orbit is greater at perigee than at apogee. The perigees can advantageously be made to coincide with periods between traffic peaks.

A satellite 1 in a 4.79-hour sidereal period ACE orbit has five apogee crossings each day, occurring above five preselected equispaced points on the equator. These points are separated by one-fifth the circumference of the earth (72° of longitude), and remain fixed throughout the year. The five apogees corresponding to the five daily orbits can be positioned over any five equispaced earth longitudes, giving great flexibility to the designers of international communications systems. Table 1 lists longitudinal limits of satellite 1 visibility for five sites at apogee longitude and 50° N latitude, for an ACE orbit having apogees at 48° W, 120° W, 168° E, 96° E, and 24° E longitude.

TABLE 1

| Worldwide Coverage Information | | | |
| --- | --- | --- | --- |
| Apogee | Longitude | Visibility Zones at 50° N | Country |
| 1 | 48° W | 6° W to 90° W | U.S.A. |
| 2 | 120° W | 78° W to 162° W | U.S.A. |
| 3 | 168° E | 150° W to 126° E | Japan |
| 4 | 96° E | 138° E to 54° E | India |
| 5 | 24° E | 66° E to 18° W | Europe |

As Table 1 indicates, the visibility zones at 50° N latitude have a 12° longitude overlap. Any point on the earth's surface south of 50° N and north of 50° S can view this ACE orbit satellite 1 above 10° elevation for at least two hours. The satellite 1 will be in position for viewing at a particular local time-of-day at each point. The local times-of-day for viewing from all points can be made to fall within a selected range of time-of-day.

As seen from Table 2 and FIGS. 7–10, 13, and 14, the coverage pattern characteristics of an ACE orbit vary with ground station 2 longitude as well as latitude. By conventional techniques of orbit injection, the times as well as the longitudes of each of the apogees can be preselected. Very good coverage for CONUS peak communications times is afforded by a satellite 1 in an ACE orbit which reaches the 48° W apogee at 11:50 a.m. and the 120° W apogee at 4:38 p.m. eastern time (corrected for earth rotation). This is the particular ACE orbit illustrated in Table 2 and in FIGS. 7–10, 13, and 14.

TABLE 2

ACE Orbit Coverages

| City | "In View" (Eastern Time) Begin | End | Duration (hours) |
|---|---|---|---|
| 1st Apogee 48° W | | | |
| San Francisco | 0945 | 1032 | .76 |
| Los Angeles | 0944 | 1053 | 1.15 |
| Denver | 0950 | 1138 | 1.79 |
| Dallas | 0948 | 1222 | 2.57 |
| Chicago | 0956 | 1232 | 2.61 |
| Miami | 0951 | 1301 | 3.17 |
| New York City | 1000 | 1300 | 3.00 |
| 2nd Apogee 120° W | | | |
| San Francisco | 1458 | 1814 | 3.26 |
| Los Angeles | 1459 | 1818 | 3.33 |
| Denver | 1514 | 1823 | 3.15 |
| Dallas | 1518 | 1830 | 3.20 |
| Chicago | 1540 | 1829 | 2.80 |
| Miami | 1539 | 1838 | 2.98 |
| New York City | 1613 | 1834 | 2.33 |

Figure 13:
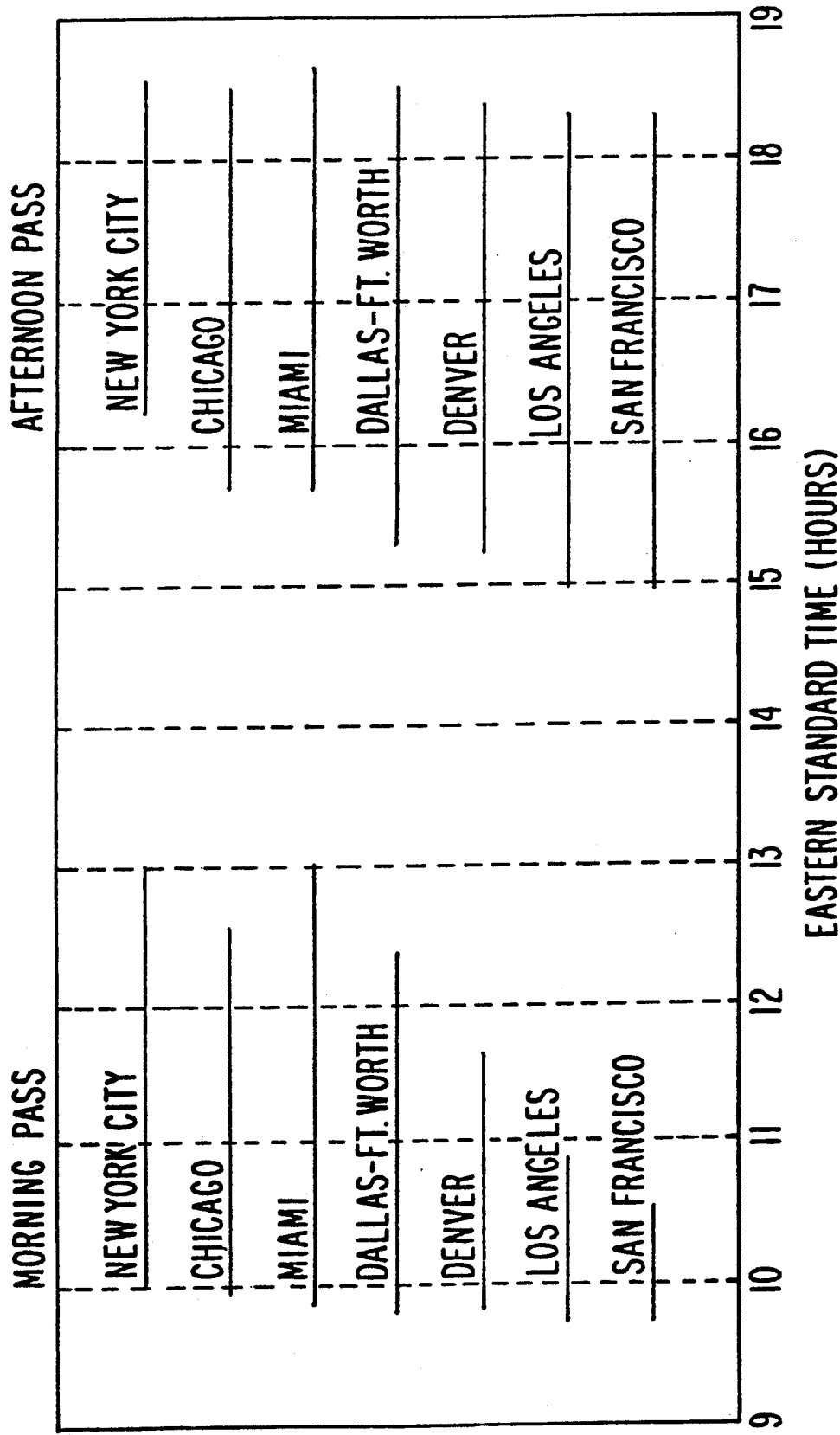
FIG. 13 is a chart showing ACE orbit coverage of selected United States cities.

FIG. 13 graphically portrays this variation in coverage duration as a function of ground terminal 2 location for CONUS, and FIG. 14 shows the coverage for this particular ACE orbit for non-CONUS locations.

The seven CONUS cities that are the subject of Table 2 and FIG. 13 have latitudes and longitudes as given below in Table 3:

TABLE 3

| City | Latitude (°N) | Longitude (°W) |
|---|---|---|
| San Francisco | 37.5 | 122.5 |
| Los Angeles | 34.1 | 118.3 |
| Denver | 39.8 | 105.0 |
| Dallas | 32.8 | 96.8 |
| Chicago | 41.8 | 87.7 |
| Miami | 25.8 | 80.3 |
| New York City | 40.5 | 74.0 |

A satellite 1 in ACE orbit is in continuous motion with respect to any ground terminal 2. For an equatorial ACE orbit, a ground station 2 observes the satellite 1 to move across the sky following the same arc each day of the year. In addition, the satellite 1 appears to be at the same point in the sky (look angles) at the same time-of-day each day. Since the satellite's look angles vary with time-of-day in the same fashion each day, the ground station 2 can track the satellite 1 in the same manner on any day of the year. This is an advantage of the ACE orbit over the Molniya orbit and other non-sun-synchronous, non-equatorial orbits.

The ACE orbit requires less fuel to achieve and maintain than does the geosynchronous orbit for a satellite 1 having the same mass. Analysis has shown that if the launch vehicle is the space shuttle/PAM-D combination, an ACE orbit satellite 1 having 1,770 kilograms of mass can be launched with the same propellant budget as a geosynchronous satellite 1 having a mass of 1,000 kilograms. If the launch vehicle is an Ariane II, an ACE orbit satellite 1 having a mass of 2,350 kilograms can be launched with the same propellant budget as a geosynchronous satellite 1 having a mass of 1,000 kilograms.

FIGS. 7 through 10 display the apparent motions of an ACE orbit satellite 1 from the point of view of four CONUS cities. In FIGS. 7–10, the solid lines each represent the entire geostationary arc (many satellites which appear to the ground station to be fixed). The dashed lines in FIGS. 7–10 represent a satellite 1 in an ACE orbit that has apogees at 48° W and 120° W longitude. All times are local times for the particular city that is the subject of the Figure. In each case, the satellite 1 appears to move from west to east, and remains over 5° away from the geostationary arc, thus advantageously avoiding RF interference with satellites in geostationary orbit. In each case, the satellite 1 is visible across CONUS for the afternoon communications peak. West coast visibility is limited during the morning peak, but west coast traffic is also limited at this hour of the day.

Figure 11:
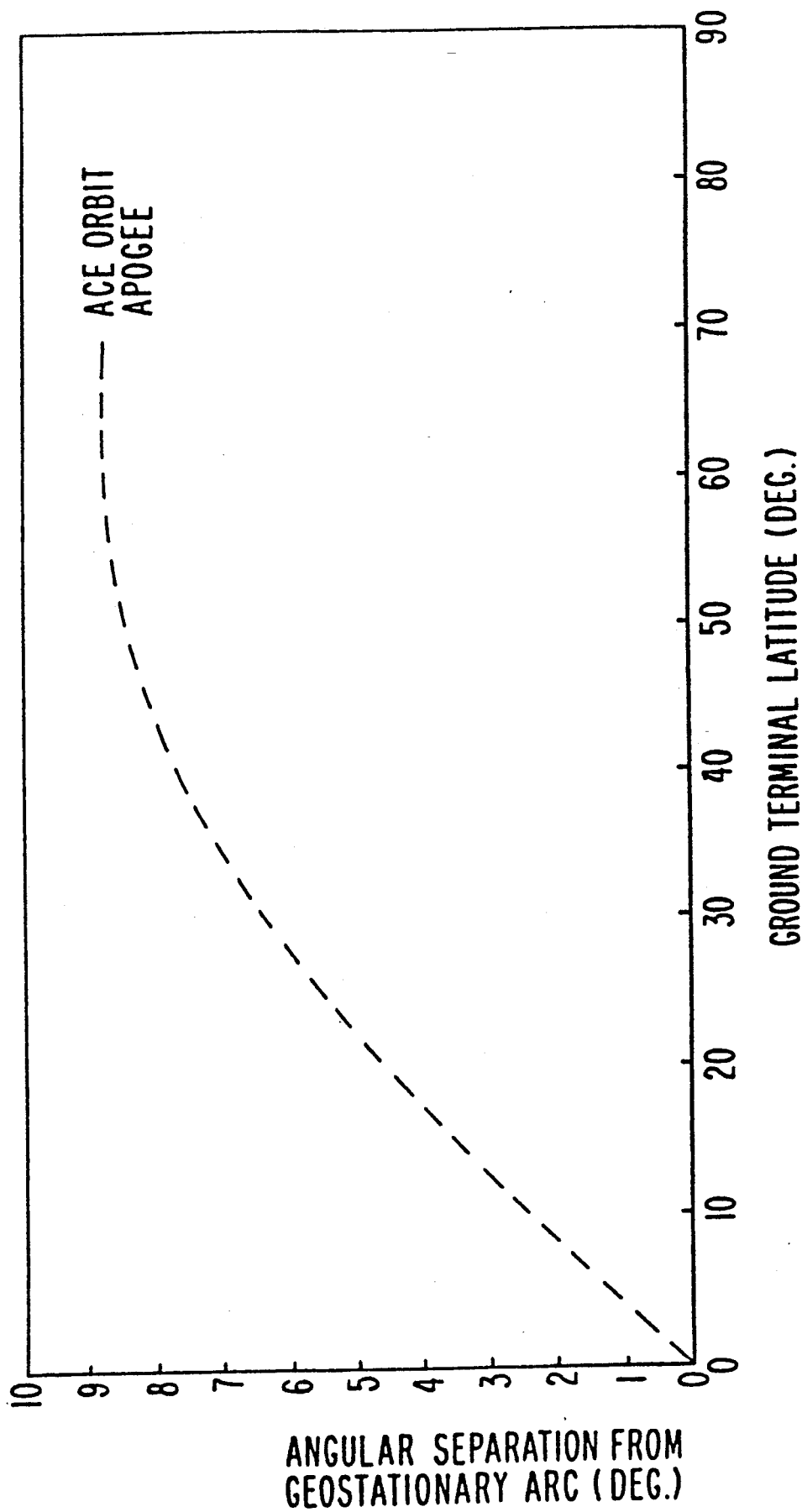
FIG. 11 is a graph showing the angular separation of an ACE orbit apogee from the geostationary arc as a function of ground terminal latitude.
Figure 12:
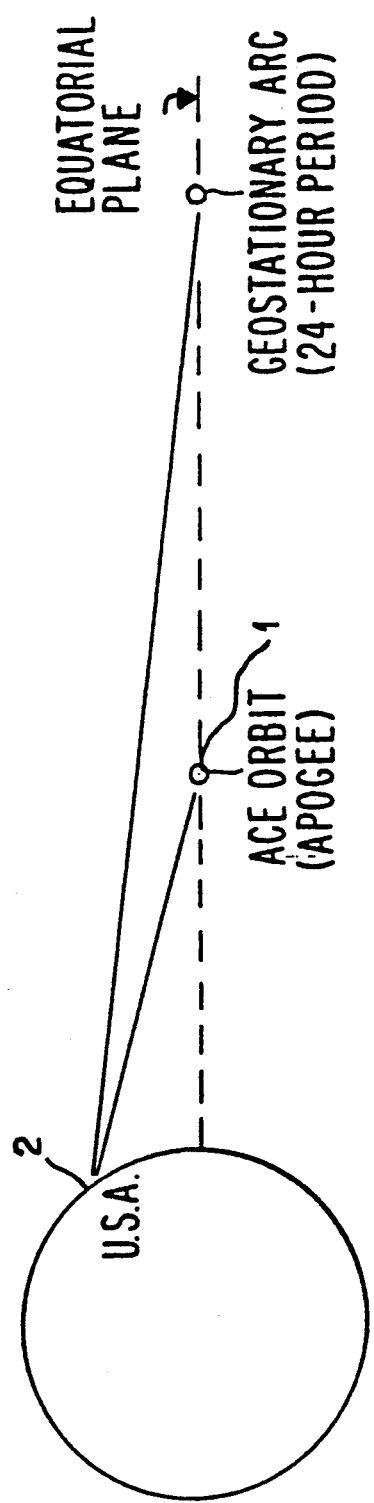
FIG. 12 is a sketch showing the angular separation of different-altitude satellites in equatorial orbits from the vantage point of the continental United States.

The angular separation of the 4.79-hour-period ACE orbit apogee from the geostationary arc is illustrated in FIG. 11 as a function of ground terminal 2 latitude (for a ground terminal 2 at apogee longitude), and is illustrated in FIG. 12 (which is drawn roughly to scale) for a random earth location within CONUS.

The plane of each of FIGS. 1–3 coincides with the orbital plane. In the case of the ACE orbit (FIGS. 2 and 3), the orbital plane is the equatorial plane, i.e., that plane which contains the earth's equator, or a plane which is slightly inclined from the equatorial plane.

The "apsidal line" of an elliptical orbit is the line connecting the perigee and the apogee. In the prior art Molniya orbit (FIG. 1), the apsidal line for a given apogee m does not substantially change direction in inertial space from day to day over the course of a year. By way of contrast, the effect of apsidal rotation causes each apogee of an ACE orbit (FIGS. 2 and 3) to rotate eastward at an angular rate of approximately one degree per day. This matches the earth's mean orbital angular rate around the sun (360° per year), enabling a satellite 1 in ACE orbit to reach each apogee at the same time each day with minimal stationkeeping.

In FIG. 2, the ACE orbit has been configured so that the illustrated apogee n (where n is an integer from 1 to 5) falls over the same earth longitude X every day of the year (Dec. 21 and March 21 are depicted) at noon local time. In FIG. 3, the ACE orbit has been configured so that the apogee n is positioned above the earth longitude X at the same time other than noon local time each day of the year. The angle A formed between the apsidal line and the earth-sun line remains substantially constant throughout the year.

In an ideal orbit, the satellite 1 would continue indefinitely following the same elliptical path. However, a real satellite 1 is acted on by many forces besides the attraction toward the center of mass of the earth. Particularly for low altitude satellites 1, the asymmetry of the earth contributes several significant perturbations. The earth has an oblate shape; its equatorial radius is greater than its polar radius. There are also minor "harmonics" of the earth's shape that produce a pear effect, making it slightly more massive in the northern hemisphere. The pear effect does not have a significant impact on the derivation of the ACE orbit.

Figure 4:
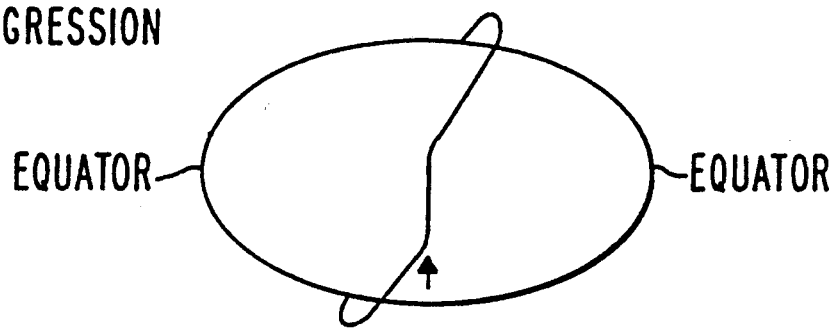
FIG. 4 is a sketch showing how the earth's oblateness causes nodal regression.

The earth's equatorial radius exceeds its polar radius by 11 nautical miles. One can imagine the earth as a sphere with a gigantic mountain range around the equator. This bulge distorts the path of the satellite 1 when it crosses the equator at either the ascending node or descending node. To simplify the discussion of the effects of this bulge, we can consider the distortion of the path as a sharp bend when the satellite 1 nears the equator, as shown in FIG. 4, in which the equatorial bulge is exaggerated for purposes of illustration.

The attractive force bends the satellite 1 trajectory northward as the satellite 1 approaches the equatorial plane from the south. As the satellite 1 leaves the equatorial plane, the orbit is bent southward, back into its original inclination. The net result of this zig-zag motion is that the ascending node is shifted or regressed opposite the direction of satellite motion. The nodal regression rate (NRR) as a function of inclination and $p_2$ is illustrated FIG. 5. The orbit parameter $p_2$ is the height of the satellite 1 (above the surface of the earth) at the end of the semi-latus rectum.

$$p_2 = a(1-e^2) - r(e) \text{ nautical miles,}$$

where
a is the semi-major axis;
e is the eccentricity; and
r(e) is the radius of the earth.

Figure 5:
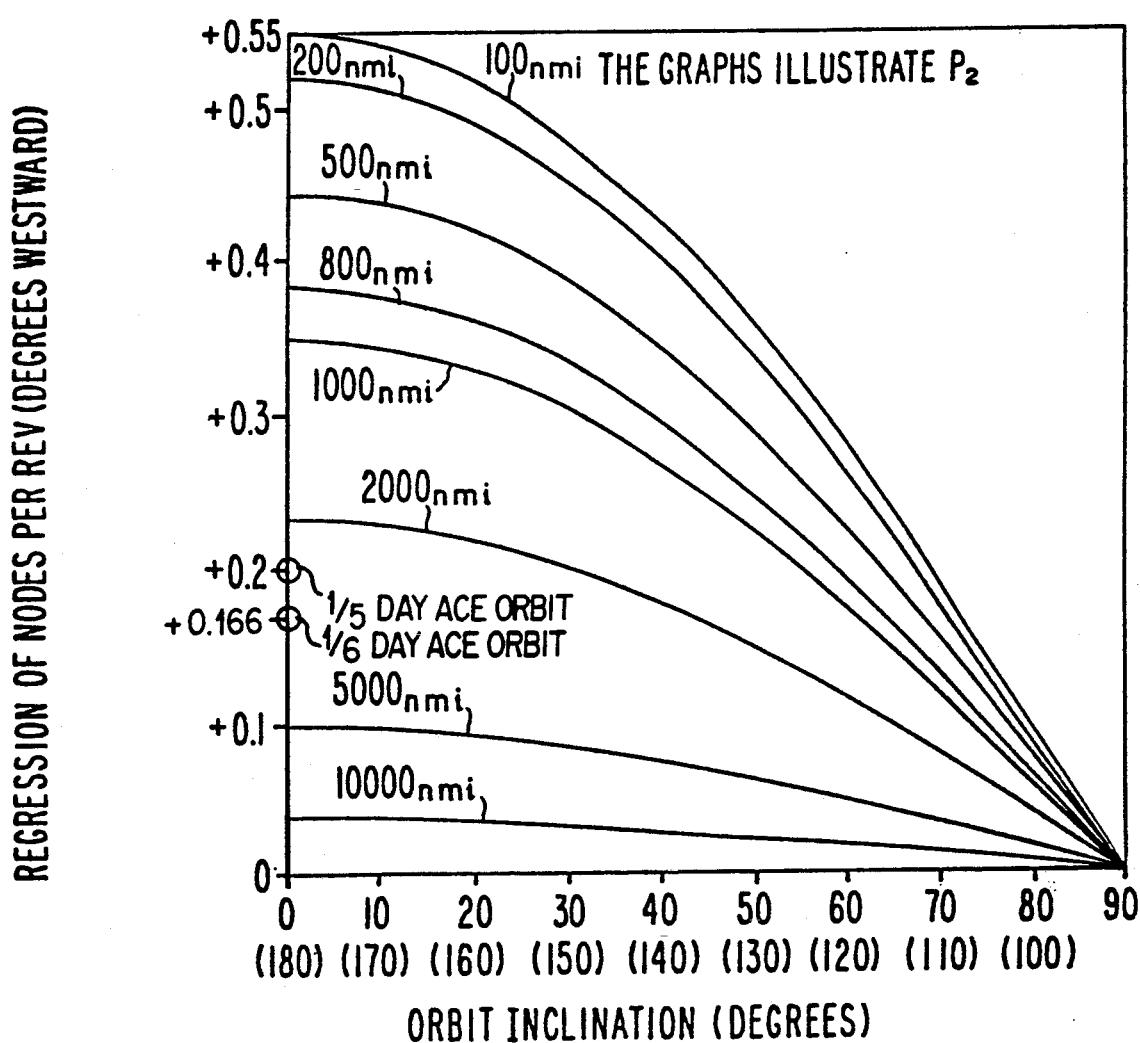
FIG. 5 is a set of graphs illustrating nodal regression as a function of orbit inclination and orbital height.

Several important relationships can be deduced from FIG. 5. First, as altitude increases, the magnitude of the nodal regression decreases. Low altitude satellites 1 are the ones most severely affected. In fact, a 200 nautical mile circular, nearly equatorial orbit experiences a complete 360° rotation of the ascending node every 43.9 days.

Another interesting variation in the nodal regression occurs by changing the inclination (angle between the orbit plane and equatorial plane). The greater the inclination, the less the nodal regression. In the extreme case of a polar orbit, the satellite 1 is accelerated as it approaches the equatorial bulge and de-accelerated as it leaves. However, there is no net change in the right ascension of the ascending node, i.e., no nodal regression.

If we examine the direction of the attraction on the satellite 1 due to the equatorial bulge, it can be resolved into two components, one perpendicular to the orbit plane and one in the orbit plane.

The force perpendicular to the orbit plane causes the orbit plane to precess like a gyroscope. It is this normal component of the force which produces the nodal regression. The component of the force in the orbit plane causes the orbit to rotate about the center of the earth. The major axis, the line of apsides, rotates, as does the apogee position.

Figure 6:
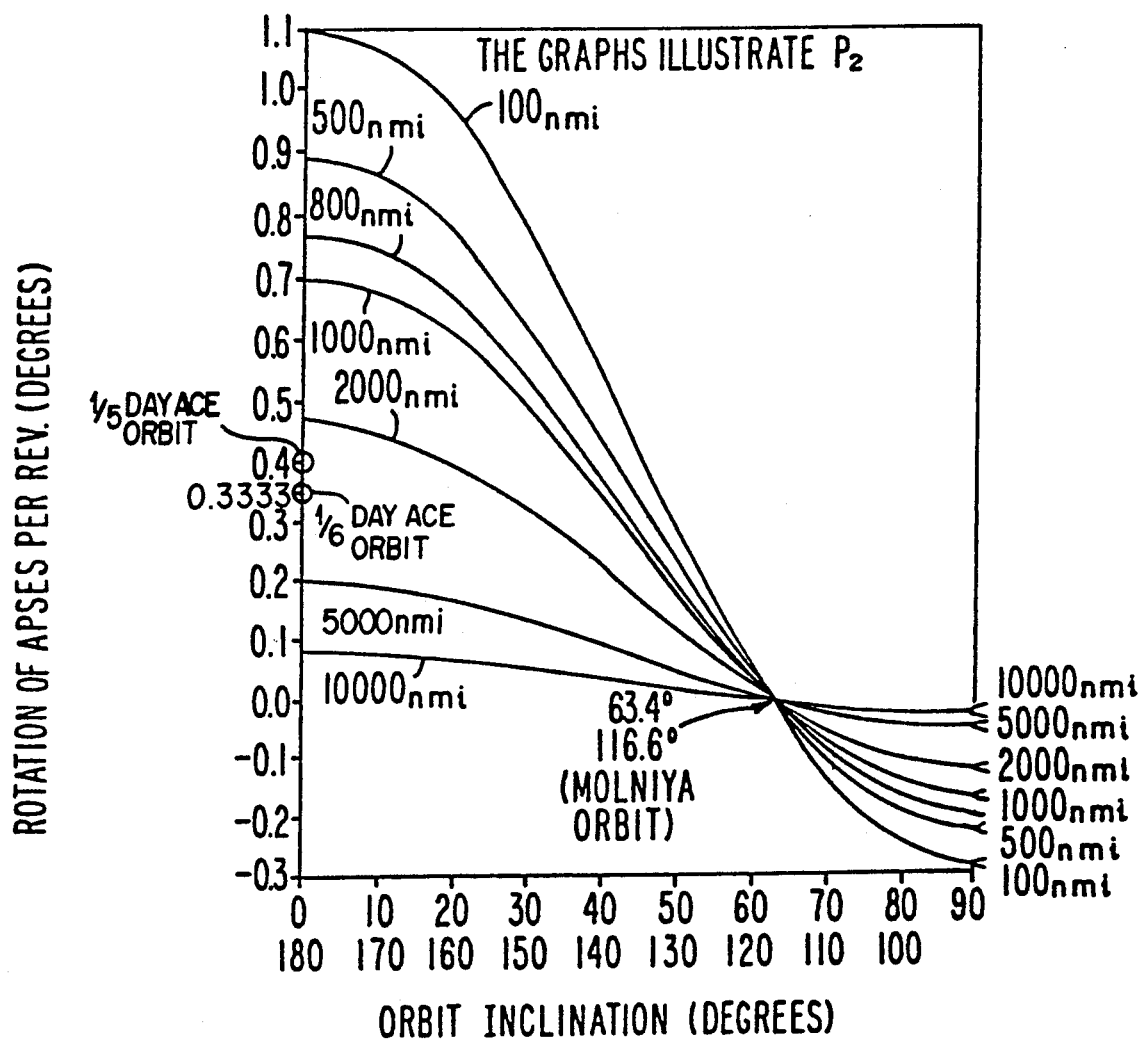
FIG. 6 is a set of graphs illustrating apsidal rotation as a function of orbit inclination and orbital height.
Figure 7:
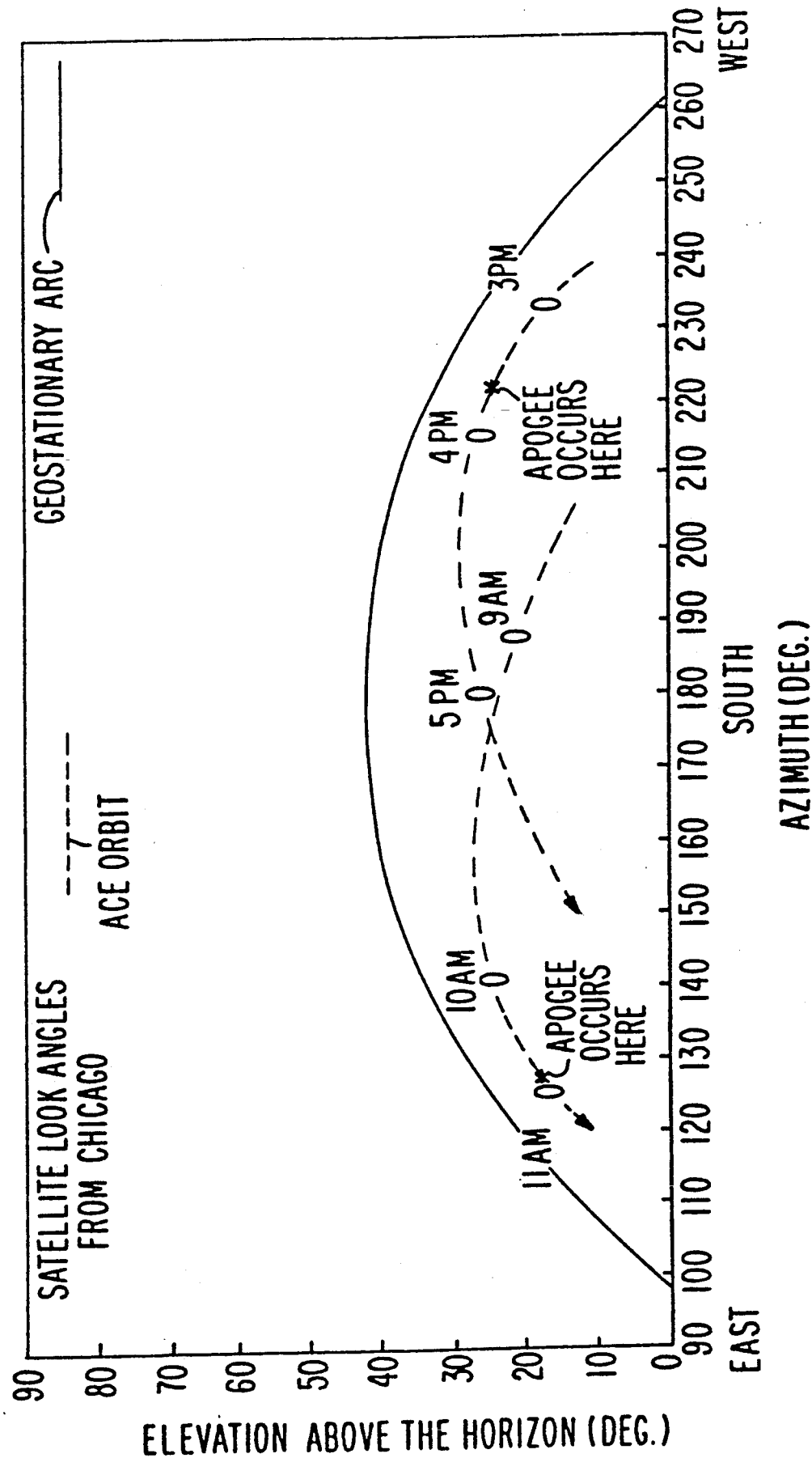
FIGS. 7 through 10 are a set of four graphs illustrating ACE orbit satellite 1 look angles from the cities of Chicago, Los Angeles, Dallas, and New York City, respectively.
Figure 8:
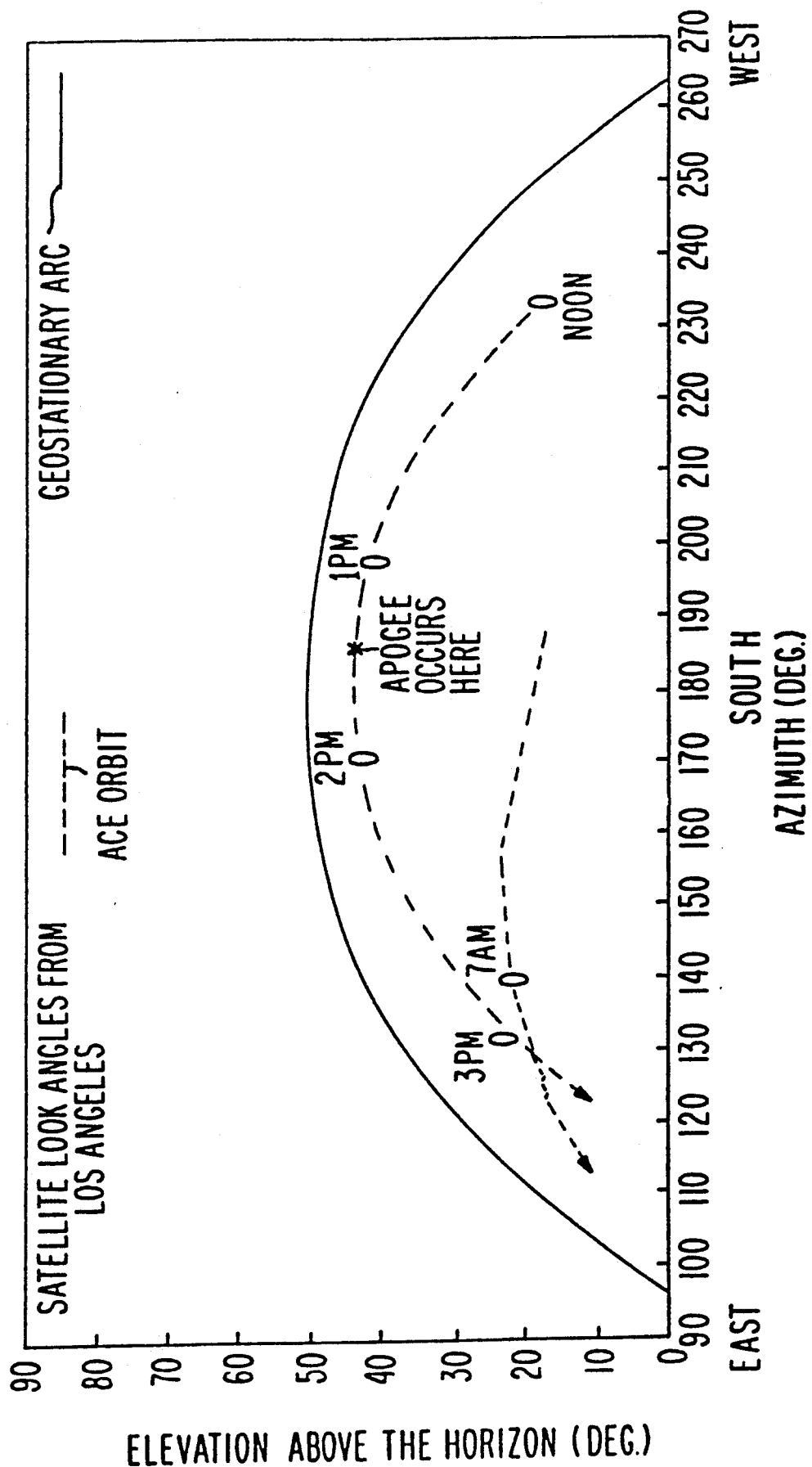
Figure 9:
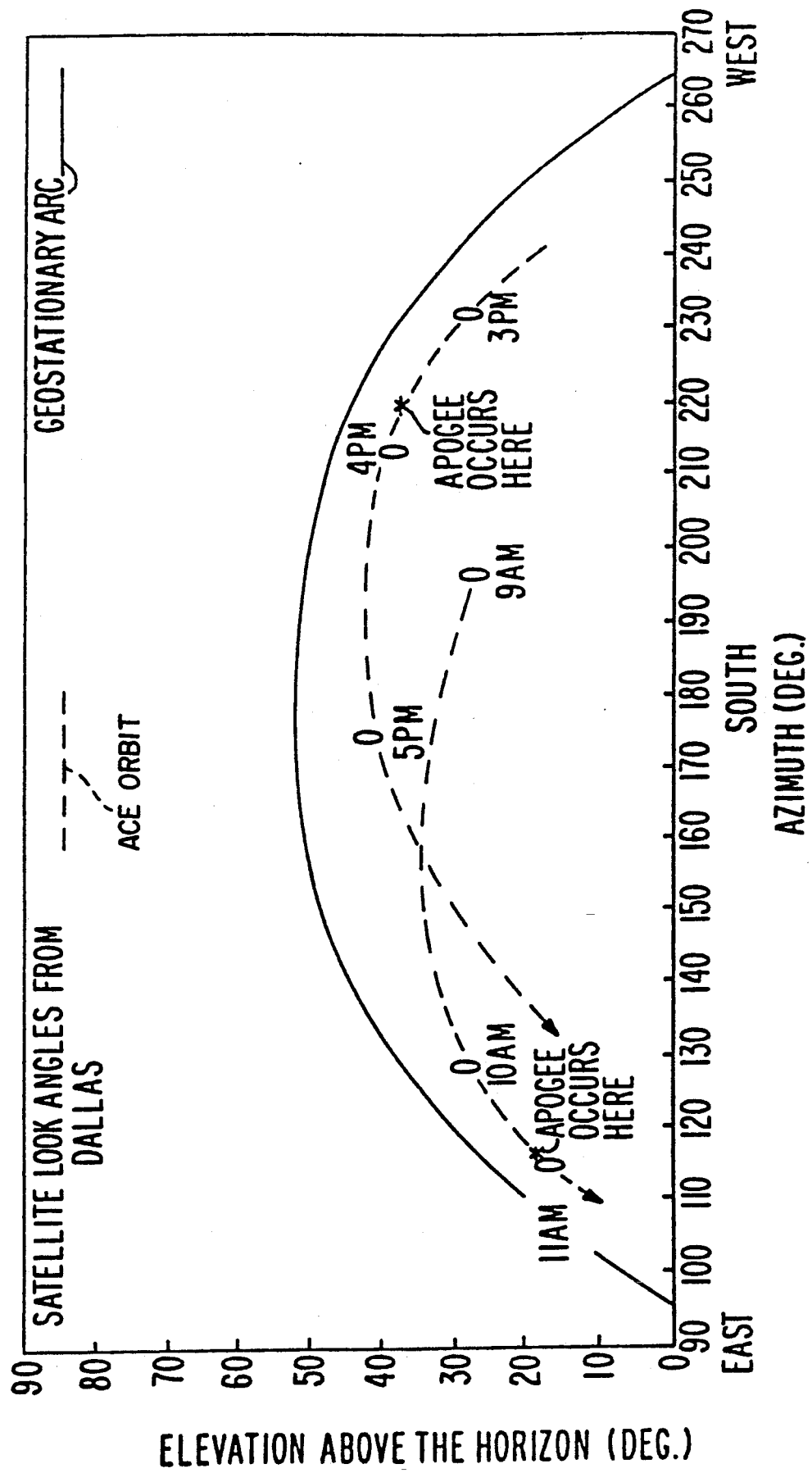
Figure 10:
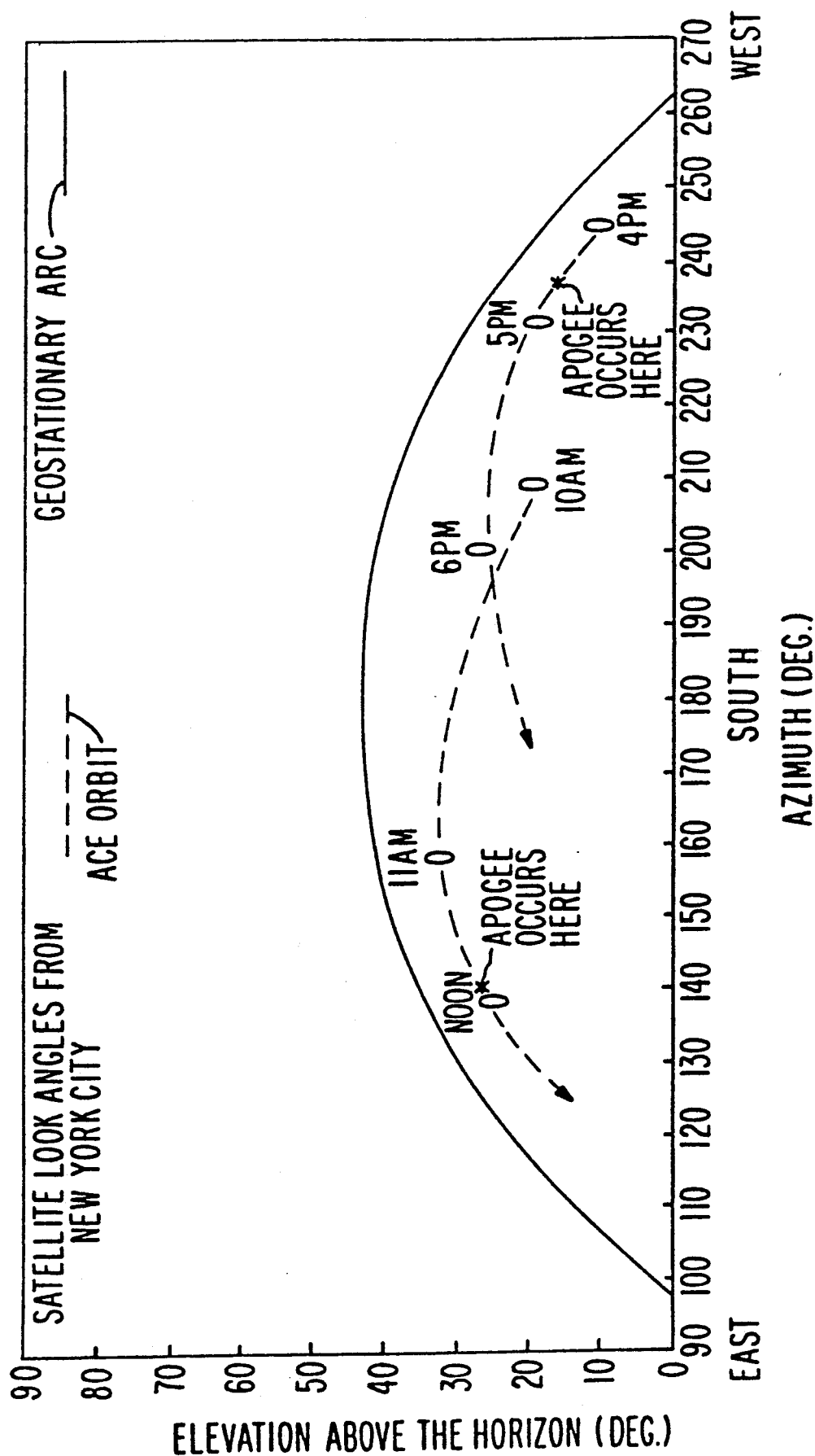

The apsidal rotation rate (ARR), illustrated in FIG. 6 as a function of inclination and $p_2$, is similar to regression of the nodes in that it diminishes with increasing altitude, and changes with inclination. However, it differs in that low inclinations produce an apsidal rotation in the direction of satellite 1 motion, and near-polar orbits produce an apsidal rotation opposite the direction of satellite 1 motion. There are two inclinations, 63.4° and 116.6°, where there is no apsidal rotation at all. These are the inclinations of the Molniya orbits, where the position of apogee remains fixed with respect to that of the ascending node.

The elements of the ACE orbit are derived as follows. The orbital period P must be of the form $P = 1/n$ days, where n is an integer, in order for the satellite 1 to satisfy the condition that it be overhead a specific point on the earth at the same apogee on successive days. In other words, the period P must be an integral fraction of a day.

The size and shape of the ACE orbit are further constrained by the dependence of the apsidal rotation rate (ARR) and nodal regression rate (NRR) on orbital dimensions. Only an orbit whose period is one-fifth of a day or less has a sufficiently small semi latus rectum to have a sufficiently large ARRIS (apsidal rotation rate in inertial space). Mathematically derived pseudo ACE orbits whose periods are one-seventh of a day or less have an ARRIS which is in excess of the mean angular rate at which the earth orbits the sun. Thus, a fifth of a day and a sixth of a day are the only periods which maintain apogees at constant solar times.

The inclination i of the orbit is preferably 0° (in other words, the orbit is an equatorial one) in order to simplify ground station antenna tracking and to maximize apsidal rotation rate in inertial space (ARRIS).

The ARRIS must be 0.986° per day to match the sun's mean annual motion, i.e., the rate that the earth revolves about the sun (360°/365 days). ARRIS is equal to ARR (apsidal rotation rate per se, which is referenced to the node of the orbit itself and not to inertial space) plus NRR (nodal regression rate). Thus, ARR+NRR must equal 0.986°. For equatorial orbits, ARR and NRR have opposite sign.

It is known from celestial mechanics that:

$$ARR = 3J_2(GM)^{\frac{1}{2}} r(e)^2 (5\cos^2 i - 1)/4a^{3.5}(1-e^2)^2$$

radians per second, and $$NRR = 3J_2(GM)^{\frac{1}{2}} r(e)^2 \cos(i)/2a^{3.5}(1-e^2)^2$$

radians per second,
where
$J_2$ is an oblateness factor and is equal to 0.001082;
G is the universal gravitational constant and is equal to $6.673 \times 10^{-11} m^2/kg^{-1}s^{-3}$;
M is the mass of the earth and is equal to $5.977 \times 10^{24}$ kg;
r(e) is the radius of the earth and is equal to 6,378,000 meters;
a is the semi-major axis of the orbit; e is the eccentricity of the orbit, a measure of its shape; e varies from zero for a circular orbit to 1 for the most elliptical orbits; and
i is the inclination of the orbit.

The range of acceptable values for the semi-major axis "a" will now be determined. It will be found that this range includes orbits with periods of 1/5 and 1/6 of a day. It will also be shown that orbits with periods of ¼ day or longer and periods of 1/7 day or shorter are not included in this range.

For i=0, using the above equations for ARR and NRR, it can be shown that $$NRR = -0.5 \, ARR$$

Since ARRIS=ARR+NRR=0.986, it follows that ARR=1.972°/day=0.0344 radians/day=$3.98 \times 10^{31}$ 7 radians/second.

Therefore, for i=0:

$$3.98 \times 10^{-7} = ARR = 3J_2(GM)^{\frac{1}{2}} r(e)^2/a^{3.5}(1-e^2)^2.$$

All terms in this expression are physical constants except for a and e. Accordingly, a will be expressed in terms of e:

$$a = 1.235 \times 10^7 (1-e^2)^{-4/7} \text{ meters}.$$

By definition, eccentricity e must be greater than or equal to zero. Therefore, the minimum value for a is 12,350 km.

The orbital period P in hours is found from a by the following equation for a in kilometers:

$$p = 2.765 \times 10^{-7} a^{3/2}.$$

The orbital period corresponding to a semi-major axis of 12,350 km is 3.79 hours, which is greater than 1/7 of a day but less than 1/6 of a day. Therefore, the 1/7 day period orbit and all orbits with shorter periods are eliminated.

The maximum allowable period is found by determining the maximum permissible eccentricity e. However, a limit one can be set only as a function of a. To do this, a minimum value for the orbital perigee radius must be assumed. The perigee radius is the minimum radius of the orbit. It is given by the equation:

$$r_p = a(1-e) = 6,878,000 \text{ meters}.$$

This radius corresponds to an altitude of 500 km, which places the perigee of the orbit above the atmosphere.

Therefore, the maximum value for e can be shown to be given by:

$$e = 1 - r_p/a = 1 - 6,878,000/a$$

where a is given in meters.

There is now a system of equations, one of which gives e in terms of a, and one of which gives a in terms of e. After some manipulation, the maximum value for e is found to be 0.544. This corresponds to a semi-major axis of 15,100 km and a period of 5.13 hours.

Thus, the orbital period P is found to have the following range:

$$3.79 \text{ hours} \leq p \leq 5.13 \text{ hours}$$

which includes periods of 1/6 of a day and 1/5 of a day. Note that periods of 1/7 day and shorter are excluded, as are periods of ¼ day and longer.

Table 4 summarizes the parameters of the above two equatorial ACE orbits:

TABLE 4

Equatorial ACE Orbit Parameters

| Parameter | Unit | Value for 1/5 day ACE Orbit | Value for 1/6 day ACE Orbit |
| --- | --- | --- | --- |
| Period P (sidereal) | hr | 4.79 | 4.00 |
| Semi-major axis a | km | 14,450 | 12,775 |
| Eccentricity e | | .49 | .23 |
| Inclination i | ° | 0.0 | 0.0 |
| Perigee radius r(p) | km | 7,410 | 9,840 |
| Perigee altitude h(p) | km | 1,030 | 3,460 |
| Apogee radius r(a) | km | 21,480 | 15,710 |
| Apogee altitude h(a) | km | 15,100 | 9,340 |
| Nodal regression rate NRR | °/day | −.986 | −.986 |
| Apsidal rotation rate ARR | °/day | 1.972 | 1.972 |

The ACE orbit, being an equatorial orbit, can be uniquely defined in terms of its apogee radius and perigee radius. Thus, causing the apsidal rotation rate in inertial space to be substantially equal to the mean rate at which the earth revolves about the sun is equivalent to forcing satellite 1 to be in an equatorial orbit and, in addition, forcing r(p) and r(a) to have the values shown in one of the two columns in Table 4 above. In practice, this can be achieved by commanding the launch vehicle to achieve the preselected r(p) or r(a), and to then have a thruster located along the periphery of satellite 1 achieve r(p) (if the launch vehicle achieved r(a)) or r(a) (if the launch vehicle achieved r(p)). The thruster can be oriented with respect to the orbital plane in such a manner that said thruster serves the dual role of simultaneously forcing satellite 1 into the equatorial plane.

Stationkeeping—As with geosynchronous orbit spacecraft, thrusters or other propulsive means are actuated at intervals to maintain satellite 1 in the ACE orbit. The gravitational attraction of the moon and of the sun cause the elements of both geosynchronous and ACE orbits to change over time. Neither a natural body such as an asteroid nor a totally passive artificial satellite such as an Echo balloon would remain in either orbit for a duration comparable to the ten-year operational lifetime of current communications satellites 1.

The maneuvers performed by the thrusters are referred to as stationkeeping maneuvers. Orbital elements such as inclination and eccentricity are maintained within narrow ranges known as "deadbands". Deadbands for an ACE orbit satellite 1 are preselected to assure that it comes into view of its ground terminals 2 at very nearly the same time-of-day every day of the year, and that its apparent motion across the sky with respect to a ground terminal 2 is very similar from one day to the next.

To maintain the deadbands, stationkeeping maneuvers are executed several times a year. The study performed for NASA Contract No. NAS3-24891 cited in the Background Art section of this specification estimated stationkeeping propellant requirements for satellite 1 in the ACE orbit. For a 12-year lifetime, a 1000-kilogram spacecraft 1 would have to carry at least 30 kilograms of propellant. This is considerably less than the minimum propellant requirement for most current geostationary spacecraft, which require at least 160 kilograms for a 12-year lifetime.

Stationkeeping is usually controlled from a Mission Control Center belonging to the satellite 1 owner. This Mission Control Center or "MCC" is equipped with tracking equipment and computers so that personnel can constantly update the orbital elements of the satellite 1 as lunar and solar gravity perturb the orbit. When the limits of the deadband are approached, the spacecraft 1 is commanded to fire its thrusters to correct its orbital elements.

Ground Terminals—Ground terminal 2 is a station, often located on customer premises, capable of tracking satellite 1. It includes an antenna and equipment capable of receiving communications signals from spacecraft 1. If terminal 2 has uplink capability, then it can also transmit signals to satellite 1. A small set of equipment used at a private residence to receive Direct Broadcast Television service constitutes a suitable ground terminal 2, as does a large antenna used by the INTELSAT consortium for intercontinental telephone communications.

Geostationary satellite ground terminal 2 antennas need not track the satellite across the sky, since the satellite appears to be almost motionless with respect to the terminal. However, these antennas often include some tracking capability for several reasons. First, the antenna may need to compensate for motions caused by strong winds and other environmental disturbances. Second, the antenna may be required to operate in conjunction with a number of different geostationary satellites, so it must swing across the sky to transfer from one to another. If such antennas have tracking capabilities, they can be easily modified for use with the present invention.

An ACE orbit satellite 1 ground terminal 2 antenna must track satellite 1 as it moves across the sky, except in special circumstances. If the ACE orbit satellite 1 executes stationkeeping maneuvers using its thrusters, the tracking pattern and therefore all antenna motions will be the same every day. A single programmed tracking sequence is used for every day of the year.

Special circumstances not requiring sophisticated tracking include low-frequency communications such as radio broadcasting and amateur radio work. In these cases, relatively broad-lobed antennas can be made which pick up the satellite's signals as long as it is well above the horizon. However, if the satellite 1 does not execute stationkeeping, it will not be above the horizon at the same local time of day throughout the year.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention. For example, the orbit could be inclined slightly and the apsidal rotation would still be sufficient to insure that the five or six apogee per day orbit would be positioned over the same areas of the earth at the same times-of-day each day of the year.

What is claimed is:

1. A man-made satellite that is made to travel in an elliptical orbit about the earth, wherein:
   the satellite revolves about the earth a discrete number of times per day;
   each of the apogees corresponding to the daily revolutions is positioned over the same earth longitude at substantially the same local time-of-day for each day of the year; and
   the apsidal rotation rate in inertial space of the orbit is substantially equal to the mean rate at which the earth revolves about the sun.

2. The satellite of claim 1 wherein the orbit lies substantially in the plane containing the earth's equator.

3. The satellite of claim 1 wherein the satellite revolves about the earth five times per day.

4. The satellite of claim 3 in which the semi-major axis of the orbit is approximately 14,450 km; and the eccentricity of the orbit is approximately 0.49.

5. The satellite of claim 3 wherein the orbit's apogee radius is approximately 21,480 km; and the orbit's perigee radius is approximately 7,410 km.

6. The satellite of claim 3 wherein the five daily apogees are positioned above any set of five preselected equispaced earth longitudes.

7. The satellite of claim 1 wherein the orbit follows substantially the same angular path each day of the year from the point of view of any point on the earth.

8. The satellite of claim 1 wherein the satellite revolves about the earth six times per day.

9. The satellite of claim 8 in which the semi-major axis of the orbit is approximately 12,775 km; and the eccentricity of the orbit is approximately 0.23.

10. The satellite of claim 8 wherein the orbit's apogee radius is approximately 15,710 km; and the orbit's perigee radius is approximately 9,840 km.

11. The satellite of claim 8 wherein the six daily apogees are positioned above any set of six preselected equispaced earth longitudes.

12. The satellite of claim 1 wherein said satellite communicates with several tracking stations located on the earth, each tracking station having an antenna adapted to point towards the satellite.

13. A method for placing a man-made satellite into an elliptical orbit about the earth, said orbit having a discrete number of daily apogees, each apogee positioned over the same earth longitude at substantially the same local time-of-day for each day of the year, said method comprising the step of:
   causing the apsidal rotation rate in inertial space of the orbit to be substantially equal to the mean rate at which the earth revolves about the sun.

14. The method of claim 13 further comprising the step of periodically performing a stationkeeping maneuver on the satellite to keep at least one of the parameters from the set of parameters comprising inclination and eccentricity within a preselected deadband.

15. The method of claim 14 wherein:
   there is at least one tracking station located on the earth, said tracking station having an antenna adapted to point towards the satellite; and
   each deadband is chosen so that the satellite comes into view of the tracking station at substantially the same time-of-day every day of the year, and the apparent motion across the sky of the satellite with respect to the tracking station is substantially the same for every day of the year.

16. The method of claim 15 wherein the tracking station antenna tracks the satellite by means of a single programmed tracking sequence that is used every day of the year.

* * * * *